March 3, 1953     E. ALLGAIER     2,630,171
TIMING DEVICE
Filed July 7, 1950
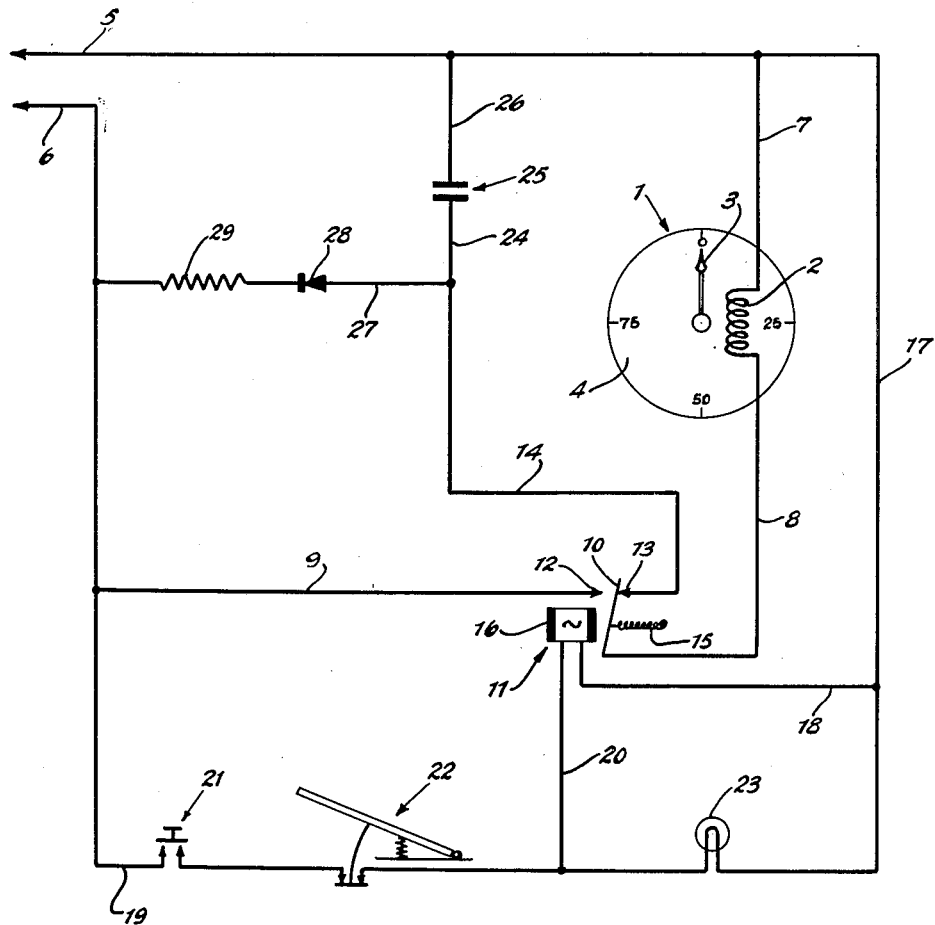
INVENTOR
Earl Allgaier
BY Albert H. Kirchner
ATTORNEY Patented Mar. 3, 1953

2,630,171

UNITED STATES PATENT OFFICE 2,630,171

TIMING DEVICE

Earl Allgaier, Arlington County, Va.

Application July 7, 1950, Serial No. 172,483

2 Claims. (Cl. 161—15)

1

The present invention relates to devices for measuring with great accuracy short intervals of time.

An important object is to provide an electrically operated registering mechanism for indicating, without error or with only a negligibly small error, the elapsed time intervening between switch operations opening or closing a circuit.

A related object is to provide a device of the character indicated including an electrically operated clock with means for adjustably controlling its lag in stopping so as to be exactly equal to its lag in starting so that the two lags will balance each other out and neither will introduce any error into the measurement of the interval.

A more specific object, in one mode of application of the principles of the invention, is to provide an instrument capable of giving, as a direct reading in small time units, say of the order of hundredths of a second, the average of a number of short time intervals. To this end the instrument may be provided with a specially calibrated dial traversed by a clock hand operated in predetermined ratio to the calibrations so that a given number of intervals successively operating the hand will be accumulated to bring the hand to a final position on the dial indicating a calibration which will designate the average interval value.

One particularly useful application of the invention is in the measuring of the average time required by a person to respond to some external stimulus, e. g., to react to a traffic stop signal by taking some appropriate action simulating the application of foot pressure to the brake pedal of an automotive vehicle. The invention is thus especially useful in testing motor vehicle drivers, or applicants for motor vehicle driver licenses, to determine by accurate time measurement their ability to initiate stopping of the vehicle sufficiently promptly. The invention has been reduced to actual practice and thoroughly tested in use in such a device and been found to give entirely satisfactory results.

A further object is to attain the foregoing and other related functions in an instrument which will be inexpensive to construct and operate, which will be mechanically and electrically simple, foolproof and dependable, and which above all will be exceedingly accurate in its determinations.

With the foregoing and other related and incidental objects in view, the invention comprises, in a preferred form of embodiment, the device which is shown diagrammatically in the accompanying drawing which will now be explained as simply one illustrative manner of practicing the inventive principles. It will be understood by those skilled in the art that these principles may be otherwise embodied and modified within the scope of the appended claims.

Generally speaking, the device comprises a synchronous motor driven clock, preferably having a specially geared single hand traversing a uniquely calibrated dial, in circuits which are selectively energizable with alternating current to drive the clockwork and with direct current to stop it, with adjustable means for making the lag in stopping exactly equal to the inevitable lag in starting. These lags are the result of electrical and mechanical inertia, and when they are equalized, as they are by the present instrument, they are mutually compensating and balance out of the reading.

Referring to the drawing, the reference numeral 1 designates generally a clock driven by a constant speed synchronous motor having a conventional field winding 2 specially geared to a single hand 3 which traverses a dial 4. A pair of main leads 5 and 6 from a source of alternating current are connected to the field winding by a direct line 7 from the main lead 5 and by a line 8 which is connectible with a branch 9 of the lead 6 through the armature 10 of a double throw relay 11. The relay includes a contact 12 at the end of branch 9, a contact 13 to which is connected another branch 14, a spring 15 biasing the armature into engagement with the contact 13, and a coil 16 which is energizable to shift the armature from the contact 13 to the contact 12.

The relay coil is supplied from the leads 5 and 6 by a circuit which includes a branch 17 connected to one of the coil terminals 18, and a branch 19 connecting the other coil terminal 20 with the main lead 6.

The branch 19 includes two switches. One of these, preferably in the form of a push button 21, is normally open, and the other, preferably made to simulate a motor vehicle brake pedal 22, is normally closed.

In parallel with the relay coil 16 is an electrically energizable sensible signaling element, such as the incandescent lamp 23. It will be obvious that the lamp and coil are energized and deenergized simultaneously, and that they are normally deenergized by the open circuit condition at the push button 21 and are energized by closing the circuit at the button, and may be kept energized by holding the button down until the pedal switch 22 is actuated to circuit opening position.

The branch 14, which terminates in the relay contact 13, against which the spring 15 normally holds the armature 10, is connected to one side 24 of a condenser 25, the other side 26 of which is connected to the main lead 5. The branch 14 is also connected to the output 27 of a rectifier 28 which in turn is connected to the main lead 6 through a resistance 29. This resistance may be an adjustable one, but since its resistance effect is intended to be set permanently at an appropriately fixed value as will be hereinafter explained, it may be a non-variable element selected at the correct predetermined value.

Use of the device constructed as above described will now be explained.

Assuming the leads 5 and 6 to be plugged into a source of alternating current, such as standard U. S. 60-cycle house current, the lock 1 is inoperative until the button 21 is pushed. Closing the button contacts results in energizing the relay coil 16 to close the armature 10 against the contact 12 and start the clock in operation by alternating current supplied to its field winding 2 from lead 5 through branch 7 and from the winding through branch 8, armature 10 and branch 9 of lead 6. At the same time the lamp 23 is lighted. The clock continues to run and the lamp remains lighted until the circuit is opened as by depressing the pedal 22. This results in extinguishing the lamp and in releasing the armature to be pulled by the spring 15 against the contact 13. A direct current circuit is thereby completed through the winding 2 by the branches 7, 8, 14 and 27 and the rectifier 28 and resistance 29. At the instant this circuit is completed, the charge that has built up in the condenser 25 surges through the winding 2, the effect of which is to jam the winding and bring the motor, and hence the clock 1, to a quick stop.

The quickness of the stop, i. e., the deceleration rate of the clock motor, can be regulated by properly adjusting the value of the resistance 29 and can be predetermined to be made exactly equal to acceleration rate of the motor. Thus, "coasting" of the motor and clockwork can be balanced against, and neutralized with, the electrical and mechanical inertia lag incident to the starting of the motor and clockwork. The result is an exceedingly accurate indication by the hand 3 of the time elapsing between closing the circuit at button 21 and opening it at pedal switch 22 or, in other words, of the time during which the lamp 23 was lit.

An important and principal use of the instrument, for which it was originally devised and in which it has functioned most successfully in actual practice, is in testing motor vehicle driver response to the flashing of traffic signals. In such use, the subject who is to be tested poises his foot over the pedal switch 22 and the operator holds the button 21. The operator pushes the button, the lamp lights, and the subject depresses the pedal as promptly as possible. The distance on the dial 4 traversed by the hand 3 indicates the time elapsed between lighting of the lamp and depression of the pedal, which of course is an accurate measure of the time that would be required by the subject to respond to the lighting of a vehicular traffic signal stop light by actuating the brake pedal of a vehicle being operated by the subject.

Of course the instrument can be put to other uses, for timing other kinds of intervals or conducting other kinds of tests.

The hand may be geared to the motor to run at any speed, and the dial may be calibrated in any units, appropriate for the kind of intervals to be measured. However, when the instrument is to be used for indicating the average of a number of intervals, as is preferred when conducting response time testing of the kind above explained, it is convenient to arrange the clockwork to drive the hand once around the dial in a number of time units, e. g., seconds, equal to the number of intervals to be measured in testing each subject, and to divide the dial calibrations into numbered fractions of said time unit, e. g., hundredths of a second, so that if the hand be set at zero at the beginning of the test the calibration at which the hand stops after the allotted number of measurements have been made will indicate directly by its number the exact measurement of the average interval. For example, suppose the hand be geared to rotate once around the dial in fifteen seconds of uninterrupted running, and suppose the dial be calibrated in one hundred equal units. With the hand initially set at zero, fifteen time intervals are measured in succession in the testing of a given single subject before the hand is reset. The accumulated movements of the hand bring it to a final position over a calibration whose number will be that of the average interval in terms of one-hundredths of a second.

Thus, experience has shown that the time required for the average automobile driver to react to illumination of the instrument lamp and act to extinguish the light is approximately .4 second. If a person having such reaction time is tested with the instrument geared and calibrated as above suggested, the sum total of the fifteen intervals, averaging .4 second, accumulated behind the moving hand will bring the hand to a final stop after six seconds of total running. This point is at six-fifteenths or forty percent of one revolution around the dial. With the dial divided into one hundred equal units, the unit at the final stopped position of the hand is numbered 40, i. e., forty one-hundredths second. Thus there is obtained a direct reading of the average interval length. Following such test the hand is reset to zero and the instrument is ready for the making of another test.

The resetting means, like all other mechanical elements, mechanisms and arrangements of the device, may take the form of any well known design. For example, the hand hub may be provided with a knob projecting through any glass crystal which may be used to cover the dial, and the hand shaft may be telescoped over or into the main clockwork drive shaft with a friction fit capable of being slipped when the knob is grasped and forcibly turned.

To illustrate the utility of and need for the invention wherever highly accurate measurements are required, it may be stated that in the conventional synchronous motor of low cost which is used to drive ordinary electric clocks, full speed is attained in .01 to .02 second after the alternating current circuit to the clock is closed, whereas the clock does not come to a full stop until .1 to .2 second after the circuit is opened. It is obvious that considerable error would be introduced by such a clock into measurements of intervals of the order of forty one-hundredths second, particularly in multiple successive measurements to determine an average. Since the problem is essentially one of accelerating or shortening the stopping time, it would seem that mechanical braking might provide a solution. However, mechanical brakes are subject to wear and to become maladjusted for other reasons, such as temperature changes, atmospheric humidity, excessive or insufficient lubrication, etc. For such reasons mechanical brakes have not proved successful. The electric braking provided by the present invention is readily adjustable to reduce the stopping time to exactly the starting time, and it involves no parts that wear or become maladjusted for any reason.

I claim:

1. In a device for accurately measuring a short time interval, a clock, a synchronous motor operatively connected to the clock for driving it, a circuit including A. C. mains, connections therefrom to the motor terminals including one contact of a double throw switch, a branch connected to one of the mains and including a rectifier, a branch connected to the other main and including a condenser, and a lead connecting the rectifier and the condenser to the other contact of the switch, whereby the condenser will be charged when the switch is set to supply A. C. to the motor and will be discharged to supply a surge of D. C. to the motor when the switch is thrown to connect the rectifier for supplying D. C. to the motor.

2. In a device for accurately measuring a short time interval, a clock, a synchronous motor operatively connected to the clock for driving it, a circuit including a first and a second A. C. main, a direct connection from the first A. C. main to one of the motor terminals, a condenser connected to said first main and to a junction, a rectifier connected to said second main and to said junction, and leads alternatively connecting said second main or said junction to the other of said motor terminals, whereby the condenser will be charged when A. C. is supplied to the motor and will be discharged to supply an initial surge of D. C. to the motor when the junction is connected to the other of said motor terminals to supply continuing D. C. to the motor.

EARL ALLGAIER.

REFERENCES CITED

The following references are of record in the file of this patent:

UNITED STATES PATENTS

| Number | Name | Date |
|---|---|---|
| 1,500,701 | Blanke | July 8, 1924 |
| 1,759,648 | Kunze | May 20, 1930 |
| 1,937,445 | Smith | Nov. 28, 1933 |
| 2,105,470 | Bower | Jan. 18, 1938 |
| 2,158,654 | Dorsett | May 16, 1939 |
| 2,212,981 | Dorsett | Aug. 27, 1940 |
| 2,260,432 | Brown | Oct. 28, 1941 |
| 2,360,667 | Flint | Oct. 17, 1944 |
| 2,445,809 | Swezey | July 27, 1948 |